United States Patent
Vuille et al.

(10) Patent No.: US 11,599,066 B2
(45) Date of Patent: Mar. 7, 2023

(54) WATCH PROVIDED WITH A CONTROL MEMBER

(71) Applicant: The Swatch Group Research and Development Ltd, Marin (CH)

(72) Inventors: Pierry Vuille, Les Emibois (CH); Simon Bourquin, Neuchatel (CH); Yvan Ferri, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 294 days.

(21) Appl. No.: 17/064,830

(22) Filed: Oct. 7, 2020

(65) Prior Publication Data

US 2021/0173351 A1  Jun. 10, 2021

(30) Foreign Application Priority Data

Dec. 10, 2019 (EP) .................................. 19214807

(51) Int. Cl.
  *G04G 21/00* (2010.01)
  *G04G 21/02* (2010.01)
  (Continued)

(52) U.S. Cl.
  CPC .............. *G04G 21/02* (2013.01); *G01D 5/142* (2013.01); *G04C 3/004* (2013.01); *G04G 9/0064* (2013.01)

(58) Field of Classification Search
  CPC ...... G04G 21/00; G04G 21/02; G04G 9/0064; G04G 17/06; G04B 3/02; G04C 3/004; G01D 5/142
  See application file for complete search history.

(56) References Cited

U.S. PATENT DOCUMENTS 5,572,489 A * 11/1996 Born ..................... G04G 9/0076
  368/21
5,691,747 A * 11/1997 Amano .................. G06F 3/0488
  345/157

(Continued)

FOREIGN PATENT DOCUMENTS

CN 101923314 A 12/2010
CN 104095354 A 10/2014

(Continued)

OTHER PUBLICATIONS

Combined Chinese Office Action and Search Report dated Nov. 25, 2021 in Patent Application No. 202011426869.4 (with English language translation and English translation of Category of Cited Documents), 14 pages.

(Continued)

*Primary Examiner* — Sean Kayes
(74) *Attorney, Agent, or Firm* — Oblon, McClelland, Maier & Neustadt, L.L.P.

(57) ABSTRACT

A watch includes a control member capable of managing a primary function of the watch, such as a rotating crown or a push-piece, as well as a magnetic ball that can be manually pivoted by the user about the centre thereof. A 3D magnetic sensor is arranged in the watch to detect the orientation of the magnetic field emitted by the magnetic ball, in addition to a processor for converting an electric signal generated by the magnetic sensor into an instruction for managing one or more other electronic functions of the watch. The magnetic ball is partially arranged inside the control member such that it is accessible to a user. The watch can further comprise a proximity sensor for detecting the axial position of the control member relative to the middle of the watch.

12 Claims, 3 Drawing Sheets

(51) Int. Cl.
  *G01D 5/14*  (2006.01)
  *G04C 3/00*  (2006.01)
  *G04G 9/00*  (2006.01)

(56) References Cited

U.S. PATENT DOCUMENTS

| | | | |
|---|---|---|---|
| 5,969,520 A | 10/1999 | Schottler | |
| 6,134,189 A * | 10/2000 | Carrard | G04C 3/004 368/69 |
| 6,501,458 B2 * | 12/2002 | Baker | G06F 3/033 345/161 |
| 6,597,378 B1 * | 7/2003 | Shiraishi | G06F 3/1454 715/764 |
| 7,404,667 B2 * | 7/2008 | Born | H01H 36/006 368/308 |
| 7,520,664 B2 * | 4/2009 | Wai | G04G 21/00 368/321 |
| 8,220,987 B2 * | 7/2012 | Kimura | G04C 3/004 368/293 |
| 9,569,002 B2 * | 2/2017 | Walker | G06F 1/1626 |
| 9,870,021 B2 * | 1/2018 | Olsson | G06F 3/0338 |
| 10,795,398 B2 * | 10/2020 | Sirohiwala | H01F 7/0273 |
| 2005/0249046 A1 * | 11/2005 | Gueissaz | G04C 3/004 368/160 |
| 2014/0307531 A1 * | 10/2014 | Boularas | G04B 37/0008 63/4 |
| 2015/0253908 A1 | 9/2015 | Go | |
| 2019/0138121 A1 | 5/2019 | Selby et al. | |
| 2019/0170834 A1 | 6/2019 | Sun et al. | |

FOREIGN PATENT DOCUMENTS

| | | |
|---|---|---|
| CN | 204116821 U | 1/2015 |
| CN | 104871120 A | 8/2015 |
| CN | 204650147 U | 9/2015 |
| CN | 105022263 A | 11/2015 |
| CN | 105547146 A | 5/2016 |
| CN | 205787624 U | 12/2016 |
| CN | 108076177 A | 5/2018 |
| CN | 108153139 A | 6/2018 |
| EP | 1 168 113 A1 | 1/2002 |
| EP | 2 789 254 A1 | 10/2014 |
| EP | 3 015 925 A1 | 5/2016 |
| SG | 143141 A1 | 6/2008 |

OTHER PUBLICATIONS

Chinese Office Action dated Jul. 27, 2022 in Chinese Patent Application No. 202011426869.4 (with English translation), 15 pages.

European Search Report dated Jun. 18, 2020 in European Application 1921-4807.0 filed Dec. 10, 2019 (with English Translation of Categories of Cited Documents), 3 pages.

Combined Chinese Office Action and Search Report dated Apr. 24, 2022 in Chinese Patent Application No. 202011426869.4 (with English translation of Office Action and English Translation of Cateogry of Cited Documents), 17 pages.

* cited by examiner

Fig. 5   A - A

WATCH PROVIDED WITH A CONTROL MEMBER

CROSS-REFERENCE TO RELATED APPLICATION

This application claims priority to European Patent Application No. 19214807.0 filed on Dec. 10, 2019, the entire disclosure of which is hereby incorporated herein by reference.

TECHNICAL FIELD

The invention relates to a watch provided with at least one feature capable of being managed electronically and provided with a control member for controlling said feature.

TECHNOLOGICAL BACKGROUND

Mechanical or electromechanical watches conventionally comprise a stem-crown that allows the position of the hands to be set by rotating the crown, as well as the barrel to be wound in the case of a mechanical watch. In most cases, the crown is located in a rest position close to the case of the watch, and it must be pulled into a setting position to adjust the time and, where appropriate, the date.

Watches are increasingly provided with additional features, such as an electronic display for personal and/or geographic information, for example an agenda, fitness data and geolocation data. This is also the case for watches equipped with a mechanical movement, for example by adding an electronic module comprising a digital screen arranged over a part of the dial.

The presence of the aforementioned additional features generally requires specific control means allowing, for example, a function to be selected or a menu to be browsed, etc.

Electronic watches have been developed with a control member of the 'joystick' or 'trackball' type. Examples of these solutions are respectively shown in the European patent documents EP 1168113 and EP 0582150. However, it should be noted that these solutions are not intended for a mechanically-wound watch. The European patent document EP 0582150 further discloses a watch provided with a stem-crown as well as a 'trackball' device. The drawback of the latter solution is that the presence of two control members separated from one another in space is not always ideal from an aesthetic and/or economic standpoint, given that the watch case is more complex to machine. It should also be noted that good sealing of the watch case is more difficult to achieve with the control members of the 'joystick' or 'trackball' type disclosed in the aforementioned prior art.

SUMMARY OF THE INVENTION

The invention aims to produce a watch that overcomes the aforementioned drawbacks. This purpose is achieved by the watch according to the accompanying claims.

A watch according to the invention comprises a control member capable of managing a primary function of the watch, such as a rotating crown or a push-piece of a chronograph, as well as a magnetic ball that can be manually pivoted by the user about the centre thereof. A 3D magnetic sensor is arranged in the watch to detect the orientation of the magnetic field emitted by the magnetic ball, in addition to a processor for converting the electric signal generated by the magnetic sensor into an instruction capable of managing one or more functions of the watch that are different to the primary function. In a manner characteristic of the invention, the magnetic ball is arranged partially inside the control member, which thus acts as a support for this magnetic ball. Thus, no specific machining operation is required to take place in the middle or any other part forming the watch case, and only the control member, which is manufactured separately from the watch case, must be configured to receive the magnetic ball. Moreover, since the control member projects outside the middle, access to the magnetic ball by a user for the actuation thereof is facilitated since this magnetic ball is located at a certain distance from the outer surface of the middle. The watch can further comprise a proximity sensor for detecting the axial position of the control member relative to the middle of the watch.

BRIEF DESCRIPTION OF THE FIGURES

The invention will be described in more detail hereinafter using the accompanying drawings, given by way of examples that are in no way limiting, wherein:

FIGS. 4 and 5 are sections showing the position of a magnetic sensor incorporated into the watch in FIGS. 1 and 2, for detecting the position of the crown relative to the middle of the watch.

DETAILED DESCRIPTION OF ONE EMBODIMENT OF THE INVENTION

The invention is described for the case of a watch with hands and a mechanical winding system, provided with additional features of an electronic kind. For example, the watch can comprise a digital screen used to display data, such as the date, the time in digital format, digital messages or other information accessible by browsing one or more menus. The watch comprises a winding and hand-setting stem-crown mechanism, such as that which is well known in the prior art. In a manner that is characteristic of the invention, and with reference to the figures, a magnetic ball 15 is arranged partially inside the crown 1. The magnetic ball allows the user to manage additional features, for example to control a cursor on the screen or select an option from a menu displayed on the screen.

The crown 1 is merely one embodiment of a control member mounted laterally relative to the middle and to which the invention is applicable. Another example of such a control member is the head (generally unable to rotate) of a push-piece of a chronograph watch, the primary function whereof is the activation of a feature of the chronograph. In general, the control member to which the invention applies is a member that is arranged so as to set at least one primary feature, of a mechanical or electronic nature, and adapted according to the invention to set one or more additional electronic features. The invention will be described with reference to the case of a rotating crown, which represents that most commonly encountered in the horological field but does not limit the scope of the invention.

Figure 1:
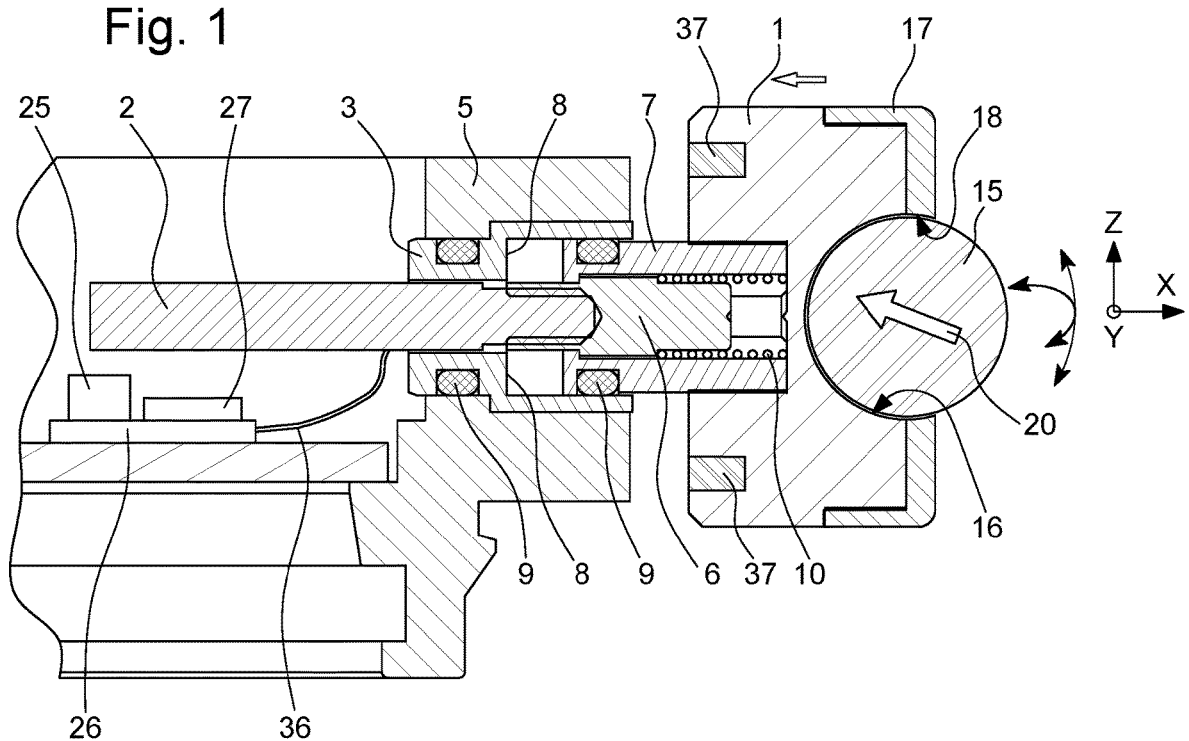
FIG. 1 shows a vertical section of the stem-crown mechanism in the 'pulled out' position, in a watch according to one embodiment of the invention.
Figure 2:
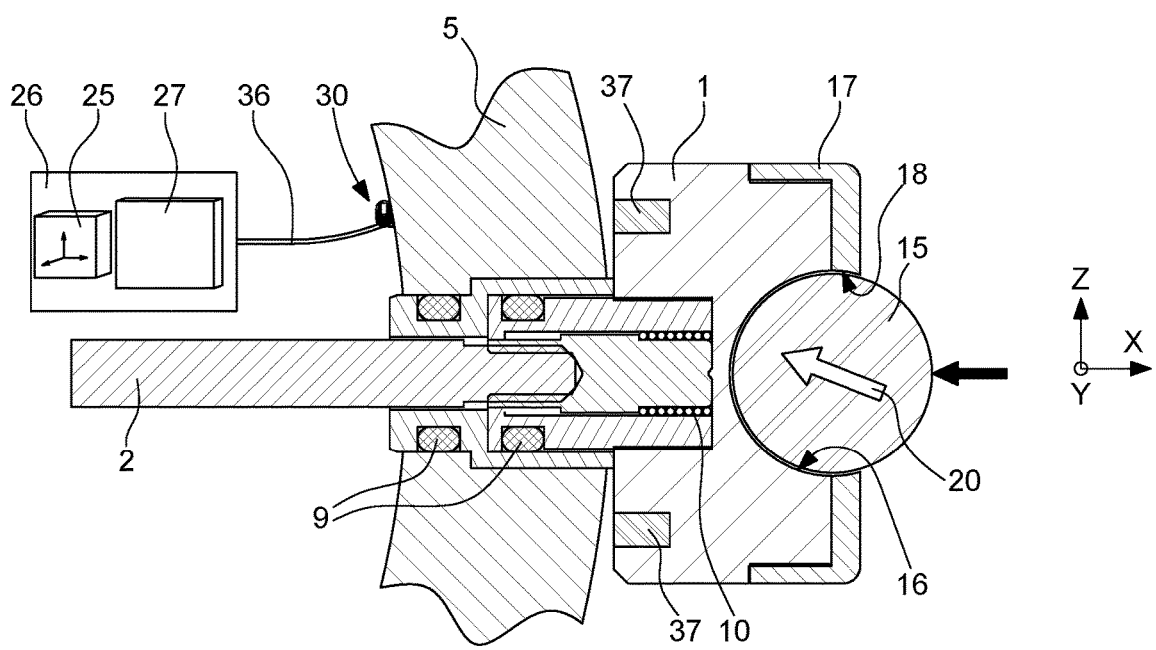
FIG. 2 shows a horizontal section of the same mechanism as FIG. 1, but now in the 'pushed in' position.
Figure 3:
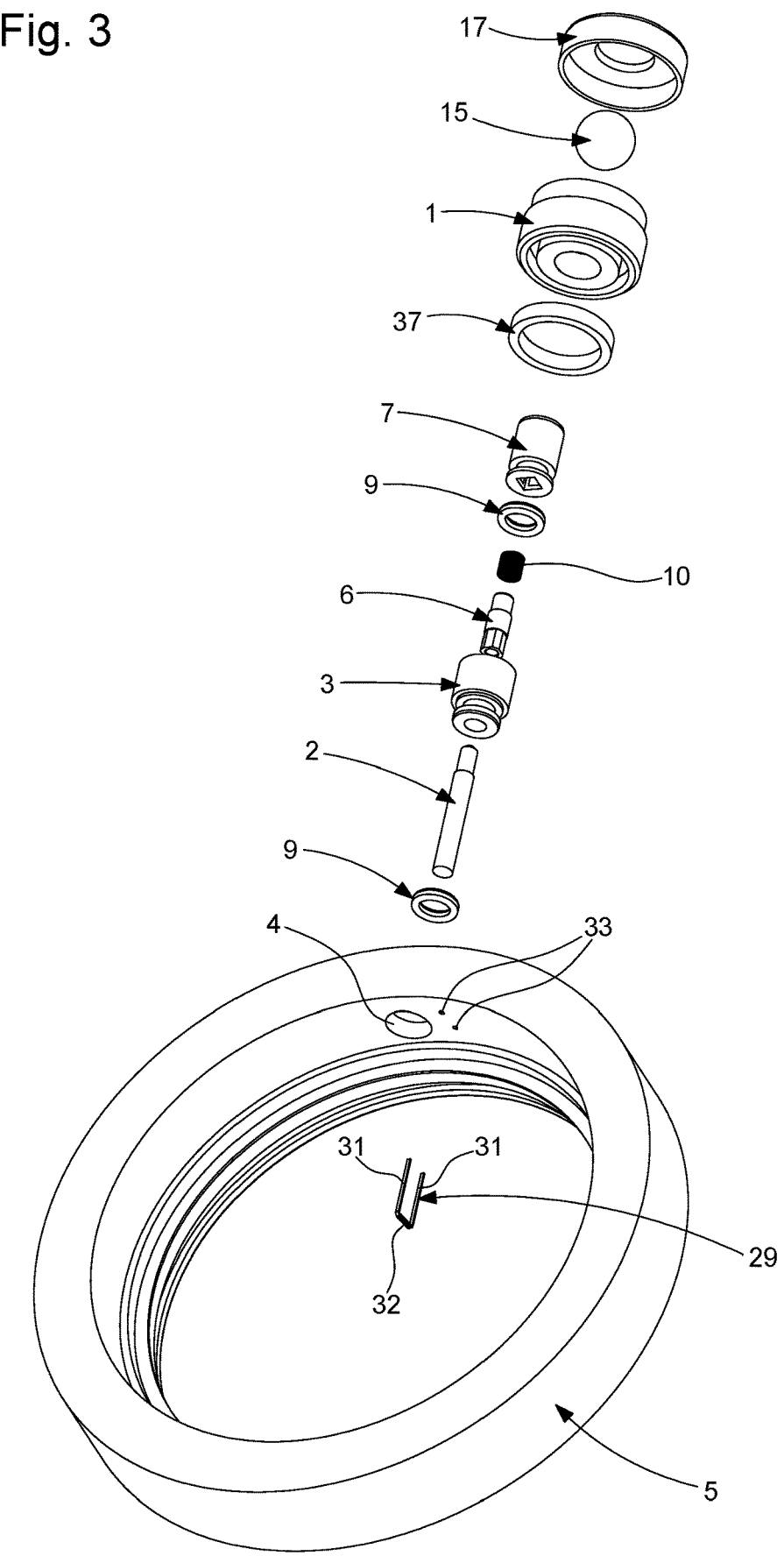
FIG. 3 shows an exploded view of the components of the mechanism in FIGS. 1 and 2.

FIGS. 1 and 2 show vertical and horizontal cross-sections of the stem-crown mechanism of a watch according to one embodiment of the invention. In FIG. 3, the different components are seen in an exploded view. In a known manner, the crown 1 is connected to a winding stem 2 by way of a stem-connector 6 driven onto one end of the stem 2. The stem 2 and stem-connector 6 assembly passes through a tube 3 mounted in a fixed manner inside a hole 4 machined in the wall of the middle 5 of the watch.

In the embodiment shown in the figures, the rotating crown 1 is connected to the stem-connector 6 by a spring-mounted push-piece mechanism known per se and which does not limit the scope of the invention. The crown 1 is fastened to a tubular element 7 which can be axially displaced relative to the stem-connector 6, which is housed inside the tubular element 7. The stem-connector 6 and the element 7 are provided with corresponding profiles which allow the stem 2 to be driven in rotation by the crown 1. As shown in FIG. 2, the pushing of the crown 1, exerted manually by the user of the watch, actuates the axial motion of the element 7 until the latter comes into contact with a vertical wall 8 of the tube 3. O-rings 9 made of a compressible material between the tube 3 and the middle 5 and between the element 7 and the tube 3 ensure that the mechanism is sealed. A spring 10 is mounted between a banking provided on the stem-connector 6 and an inner surface of the crown, such that the pushing of the crown compresses the spring 10, which repels the crown back into the initial position thereof as soon as the pressure exerted on the crown is released. The extended position shown in FIG. 1 is thus the rest position of the crown. The function of the magnetic ball 15 is ensured at least when the crown is located in this rest position.

The ball 15 is partially incorporated into the crown 1, preferably such that the centre of the ball 15 is located on the axis of rotation of the crown. This is carried out by machining a semi-spherical cavity 16 in the outer surface of the crown, dimensioned so as to receive the ball 15. Then, a cover 17 is mounted in a fixed manner on the crown 1, the cover being provided with an opening, the inner surface 18 whereof is also spherical with the same curvature as the cavity 16. In this manner, the ball 15 is held in place while allowing a part of the ball to protrude from the surface of the cover 17. The surfaces of the ball 15 and of the cavity 16, as well as the inner surface 18 of the cover 17 are configured such that the ball 15 can slide inside the cavity 16 relative to the surface 18. The ball 15 can thus pivot about the three spatial axes X, Y, Z, with the centre of the ball remaining unmoving relative to the crown 1. The user can actuate this pivoting by manipulating the part of the ball that protrudes from the surface of the cover 17, preferably using a finger to pivot the ball.

The ball 15 is made of a permanent magnetic material forming a bipolar magnet. In an alternative embodiment, a bipolar magnet is incorporated into a ball forming a non-magnetic casing for the magnet. The ball thus comprises two magnetic poles which generate a permanent magnetic field. The direction of the field is indicated by the arrow 20 in FIGS. 1 and 2.

Manipulation of the ball 15 by the user changes the orientation of the magnetic field relative to the spatial axes X, Y, Z. The watch is equipped with a 3D magnetic sensor 25 which is arranged so as to detect the magnetic field generated by the ball and determine the orientation thereof. The sensor 25 is mounted on a printed circuit board (PCB) 26 installed inside the watch. The sensor 25 can be a sensor that is known per se, such as a Hall effect sensor. The intensity of the magnetic field emitted by the ball 15 and the distance provided between the ball 15, when the crown is in the rest position thereof, and the sensor 25 are configured such that, in the position of the sensor 25, the earth's magnetic field, which is located between 30 to 60 µT, is negligible relative to the field generated by the ball 15.

The ball 15 is operated in the same manner as a 'trackball', and allows any changes in the angular position of the ball to be converted into instructions for activating or selecting electronic features. Preferably, only changes about the Y and Z axes are effectively converted into electric signals, which will form the basis of the instructions, for example to scroll in two directions in a menu displayed on a digital screen.

A processor 27 is embedded in the PCB 26 to process the signals generated by the sensor 25 and to convert them into instructions which will manage one or more electronic functions of the watch, for example control of a cursor on the screen in two dimensions. Methods and algorithms well known in the computer technology field can be implemented to process the signals and generate the instructions. A battery or other electrical power source, such as a photovoltaic cell, is present in the watch to power the components mounted on the PCB 26 and/or other electronic components implemented inside the watch.

The figures also show a proximity sensor 30 configured to detect the axial position of the crown 1. In the embodiment shown in the figures and shown in detail in FIGS. 4 and 5, this sensor comprises a 'U'-shaped bar 29. The bar 29 is made of a ferromagnetic material such as ferrite. This bar comprises two legs 31 and a connecting portion 32 between the legs. The two legs are inserted into respective blind holes 33 made in the wall of the middle 5, from the interior of the wall towards the exterior, such that the ends of the legs are positioned in the vicinity of the lateral outer surface 34 of the wall of the middle 5. The holes 33 could also pass through the wall from end to end. The connecting portion 32 is provided with a solenoid 35, connected by an electric wire 36 to the PCB 26 on which means for measuring a current passing through this solenoid are located, when it is subjected to a certain electrical voltage, and for communicating the value of the current to the processor 27.

Figure 4:
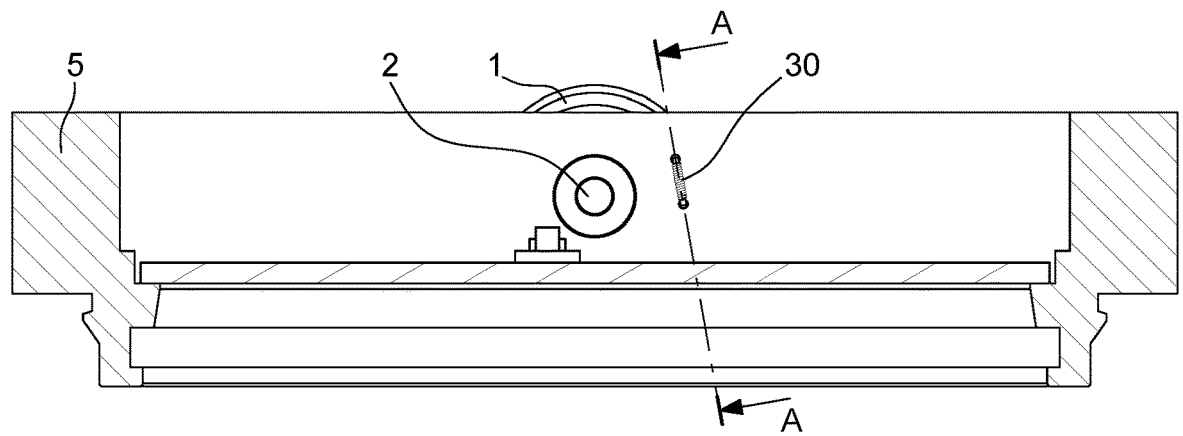
Figure 4:
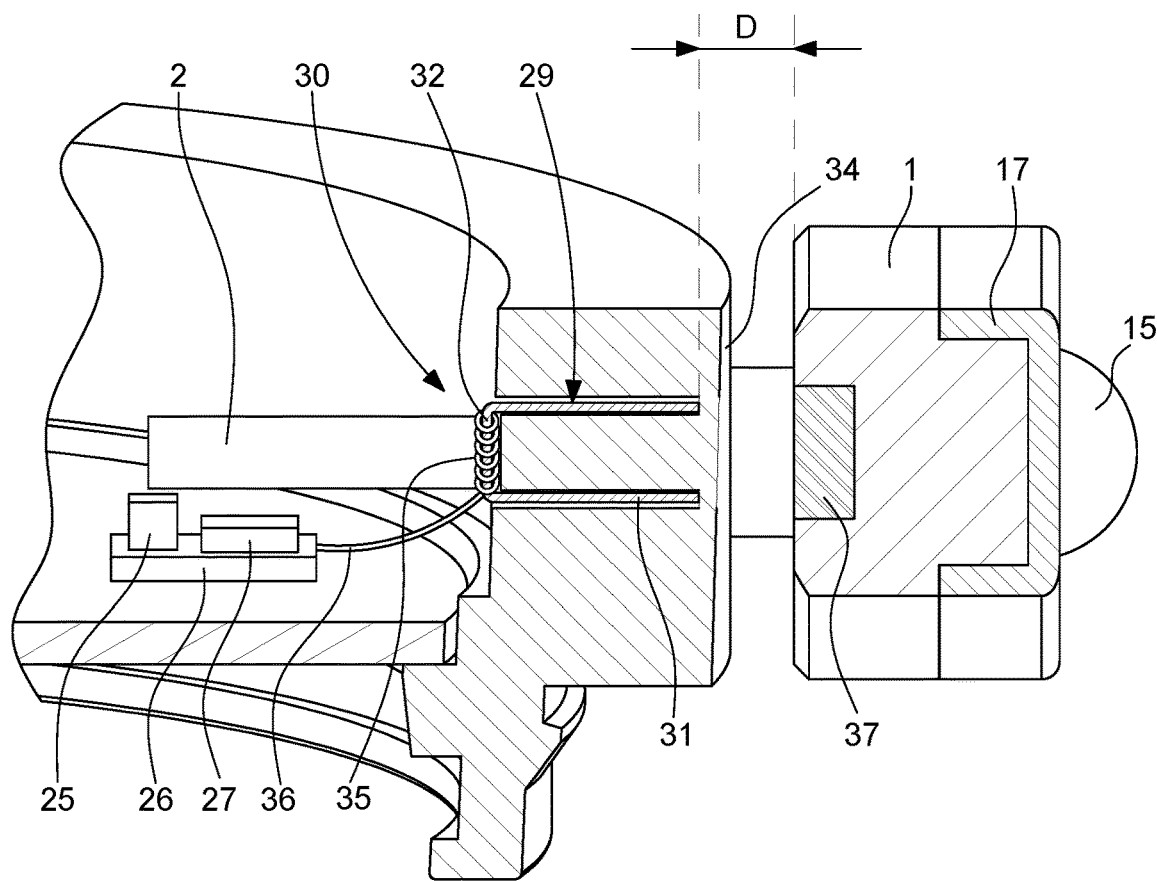

As shown in FIG. 4, the sensor 30 is positioned beside the stem-crown mechanism, but at a distance ensuring that the ends of the legs 31 are located facing the inner surface of the crown 1. A ring made of ferromagnetic material 37 (for example ferrite) is incorporated into the crown 1, such that the lateral surface of this ring 37 is located facing the ends of the legs 31. The U-shaped bar 29 forms a part of a variable reluctance magnetic circuit, the reluctance varying as a function of the position of the ring 37, and thus of the crown 1. A change in the distance D indicated in FIG. 5 will change the reluctance of the magnetic circuit, which will be detected on the basis of a change to the current in the solenoid 35. This principle is known per se and other embodiments of this type of sensor can be used.

In the embodiment shown in the figures, the sensor 30 is configured so as to detect the pushing of the crown, actuated by the user against the force of the spring 10, and so as to generate an electric signal as a function of this detection, such that the processor generates, in response thereto, a specific instruction that is different from the instructions generated by manipulating the ball 15. The instructions generated by pushing the crown 1 can be, for example, instructions confirming a selection from among the options presented in a menu. The revertible pushing can also be used to activate and then deactivate the 'trackball' feature of the ball 15. In an alternative embodiment, the duration of the push can determine the instruction; for example, a longer duration for activating or deactivating the 'trackball' feature and a shorter duration for confirming a selection once the feature is active.

In place of the magnetic sensor 30, other types of proximity sensors can be used to fulfil the same functions. For example, a capacitive sensor can be provided, which is produced by integrating two plates of a capacitor respectively arranged in the tube 3 and in the element 7.

In many mechanical or electronic watches, the crown can be moved away from the middle 5, by manually pulling the crown 1 relative to the rest position, to activate mechanical setting modes such as to adjust the position of the hands or the date. Different systems exist for setting the axial positioning of the crown 1 and the actuation of the mechanical setting, and the invention is applicable in conjunction with any of these systems. Moreover, in a watch according to the invention, any one of these systems can be combined with a crown with a push-piece as described hereinabove. When the crown is moved away from the middle into the setting position, the magnetic ball 15 is preferably deactivated, for example by way of the sensor 30. However, in an alternative embodiment, the ball can remain in operation in this distant position and fulfil the same function or a different function.

The invention is thus not limited to mechanically-wound watches, but is also applicable to electronic or electromechanical watches. The main characteristic of the invention is that the magnetic ball is partially incorporated into the control member. In this manner, there is no longer any need to apply a plurality of control members in order to control different functions.

The invention claimed is:

1. A watch comprising:
   a watch case that includes a middle, a horological movement inside the middle, and a control member mounted laterally relative to the middle, the control member being configured to control at least a primary feature of the watch, the watch being provided with one or more additional features capable of being managed by electric signals;
   a magnetic ball partially incorporated into the control member such that said magnetic ball can pivot about a center thereof in three spatial directions, the center remaining unmoving relative to the control member, and such that the magnetic ball can be accessed by a user of the watch such that the user can manually pivot the magnetic ball;
   a magnetic sensor arranged in a fixed manner relative to the watch case, said magnetic sensor being configured to detect an orientation of a magnetic field generated by the magnetic ball and to provide an electric signal representative of said orientation; and
   a processor configured so as to manage said one or more additional features based on of the electric signal generated by the magnetic sensor,
   wherein the control member is capable of being displaced between a first position close to the middle and at least one second position located further away from the middle.

2. The watch according to claim 1, further comprising a proximity sensor configured to detect an axial position of the control member relative to the middle.

3. The watch according to claim 2, wherein said proximity sensor is a variable reluctance magnetic sensor.

4. The watch according to claim 3, wherein the proximity sensor comprises a U-shaped bar made of a ferromagnetic material, the bar comprising two legs and a connecting portion and being provided with a solenoid, the two legs being arranged in a lateral wall of the middle such that free ends of the legs are located in a vicinity of a lateral outer surface of the middle and facing a ferromagnetic material forming, at least in part, the control member, the solenoid being connected to a means for detecting the intensity of a current passing therethrough when a certain voltage is applied thereto.

5. The watch according to claim 2, wherein:
   the control member is capable of being axially approached, in a self-reverting manner, towards the middle, from a rest position;
   the proximity sensor is arranged so as to be able to detect an approach; and
   the processor is configured so as to produce, in response to the detection of the approach, an instruction that is different from the instructions generated by the manipulation of the magnetic ball.

6. The watch according to claim 5, wherein the control member is linked to a push-piece mechanism mounted on a spring.

7. The watch according to claim 5, wherein an instruction generated by the detection of approach is activation or deactivation of the magnetic ball.

8. The watch according to claim 5, wherein an instruction generated by the detection of the approach is confirmation of a selection.

9. The watch according to claim 1, wherein the control member is a rotating crown, a rotation of the crown about an axis of rotation thereof controlling at least said primary feature.

10. The watch according to claim 9, wherein the crown is connected to a stem for setting one or more features of the horological movement.

11. The watch according to claim 1, wherein the horological movement is mechanical.

12. The watch according to claim 1, wherein the magnetic sensor is mounted on a printed circuit board installed inside the watch case.

* * * * *